United States Patent
Kwon

(10) Patent No.: US 10,534,999 B2
(45) Date of Patent: Jan. 14, 2020

(54) APPARATUS FOR CLASSIFYING DATA USING BOOST POOLING NEURAL NETWORK, AND NEURAL NETWORK TRAINING METHOD THEREFOR

(71) Applicant: Samsung Electronics Co., Ltd., Suwon-si (KR)

(72) Inventor: Keun Joo Kwon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 990 days.

(21) Appl. No.: 14/865,980

(22) Filed: Sep. 25, 2015

(65) Prior Publication Data
US 2017/0068887 A1    Mar. 9, 2017

(30) Foreign Application Priority Data
Sep. 26, 2014    (KR) .................. 10-2014-0129558

(51) Int. Cl.
*G06N 3/04*    (2006.01)
*G06N 3/08*    (2006.01)

(52) U.S. Cl.
CPC .............. *G06N 3/084* (2013.01); *G06N 3/04* (2013.01)

(58) Field of Classification Search
None
See application file for complete search history.

(56) References Cited

U.S. PATENT DOCUMENTS

| | | |
|---|---|---|
| 8,843,424 B2 | 9/2014 | Mei et al. |
| 2008/0215514 A1 | 9/2008 | Morgan |
| 2012/0089545 A1 | 4/2012 | Mei et al. |
| 2013/0117207 A1 | 5/2013 | Kim et al. |
| 2014/0089236 A1 | 3/2014 | Lee et al. |

FOREIGN PATENT DOCUMENTS

| | | |
|---|---|---|
| EP | 2 472 441 A2 | 7/2012 |
| KR | 10-2013-0050707 A | 5/2013 |
| KR | 10-2014-0039888 A | 4/2014 |

OTHER PUBLICATIONS

Jones, An Introduction to Neural Networks, A White Paper, Visual Numerics, Inc., Dec. 2004.*
Moody, Prediction Risk and Architecture Selection for Neural Networks, From Statistics to Neural Networks: Theory and Pattern Recognition Applications, NATO ASI Series F, Springer-Verlag, 1994, pp. 1-19 (Year: 1994).*
Bengio, Deep Learning of Representations: Looking Forward, International Conference on Statistical Language and Speech Processing, SLSP 2013: Statistical Language and Speech Processing (2013) pp. 1-27 (Year: 2013).*

(Continued)

*Primary Examiner* — Wilbert L Starks
(74) *Attorney, Agent, or Firm* — NSIP Law

(57) ABSTRACT

An apparatus for classifying data using a neural network includes an input layer configured to receive input data; an output value to output a plurality of first output values of the input data with respect to each of at least one of all classes, and output only one first output value of the input data with respect to each of a rest of all of the classes; and a boost pooling layer to receive one or more output values output for each class, and output one second output value for each class.

21 Claims, 9 Drawing Sheets

(56) References Cited

OTHER PUBLICATIONS

D. E. Rumelhart et al., "Learning representations by back-propagating errors," *Nature*, vol. 323, No. 6088, Oct. 9, 1986, pp. 533-536.
R. Polikar, "Ensemble Based Systems in Decision Making," *IEEE Circuits and Systems Magazine*, Third Quarter 2006, pp. 21-45, Sep. 6, 2006.
H. Ryu et al., "Combining Classifiers to Improve the Performance of a Neural Network.Classifier," *Proceedings of the 15th Conference of the Korea Society for Information Management*, Aug. 2008, pp. 207-214 (in Korean, including English abstract).
Y. LeCun et al., "Convolutional Networks and Applications in Vision," *Proceedings of the 2010 IEEE International Symposium on Circuits and Systems (ISCAS 2010)*, May 2010, pp. 253-256, conference held May 30-Jun. 2, 2010, Paris, France, paper presented on May 31, 2010.
J. Bozsik, "Decision tree combined with neural networks for financial forecast," *Periodica Polytechnica Electrical Engineering*, vol. 55, No. 3-4, 2011, pp. 95-101.
A. Krizhevsky et al., "ImageNet Classification with Deep Convolutional Neural Networks," *Advances in Neural Information Processing Systems 25: Proceedings of the 26th Annual Conference on Neural Information Processing Systems (NIPS 2012)*, Dec. 2012, pp. 1-9, conference held Dec. 3-8, 2012, Lake Tahoe, Nevada, paper presented on Dec. 4, 2012.

\* cited by examiner

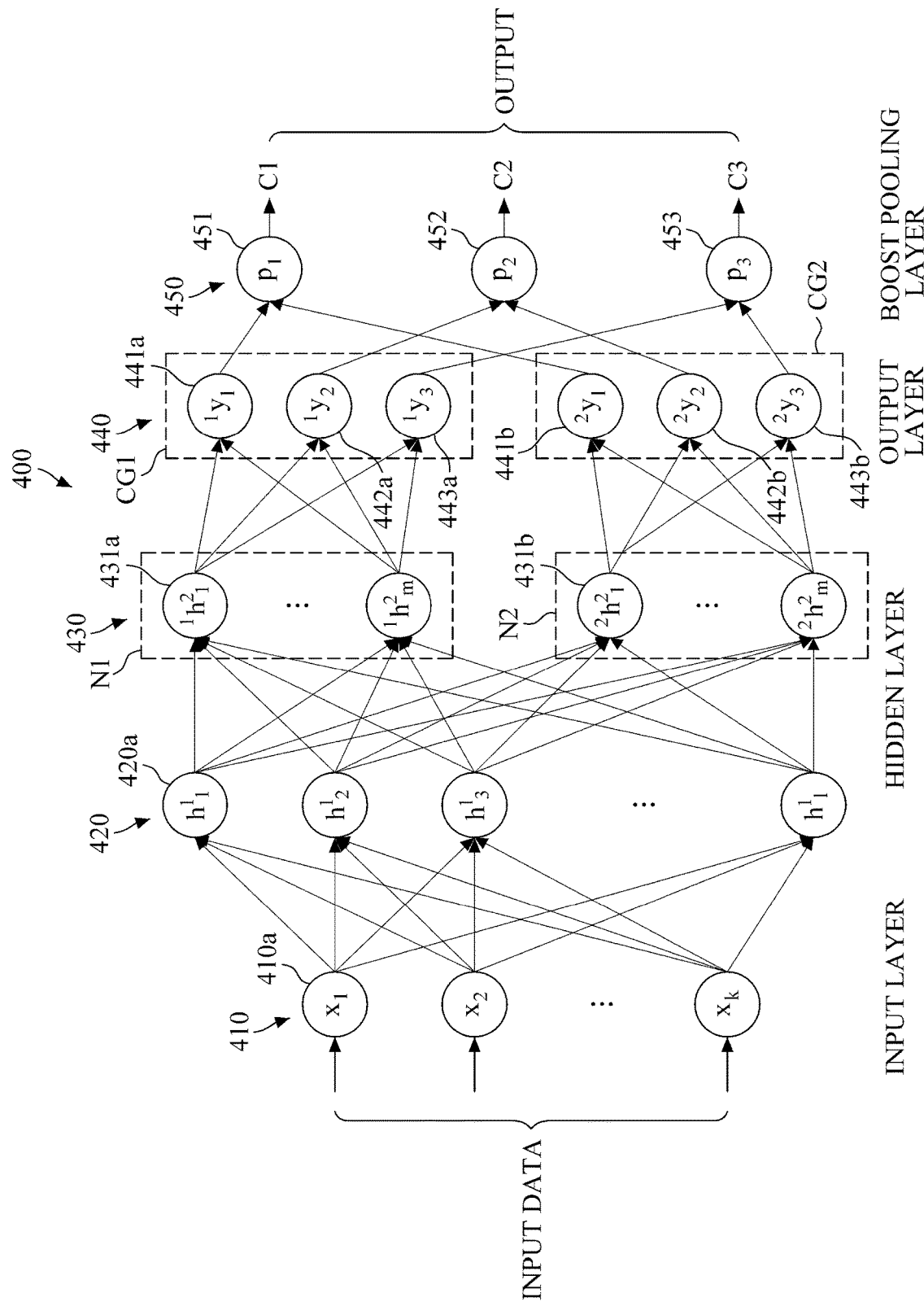

APPARATUS FOR CLASSIFYING DATA USING BOOST POOLING NEURAL NETWORK, AND NEURAL NETWORK TRAINING METHOD THEREFOR

CROSS-REFERENCE TO RELATED APPLICATION(S)

This application claims the benefit under 35 USC 119(a) of Korean Patent Application No. 10-2014-0129558 filed on Sep. 26, 2014, in the Korean Intellectual Property Office, the entire disclosure of which is incorporated herein by reference for all purposes.

BACKGROUND

1. Field

The following description relates to an apparatus for classifying data using a boost pooling neutral network, and a boost pooling neural network training method therefor.

2. Description of Related Art

There are various methods of classifying data through machine learning. Among them, a method of classifying data using a neural network is one example. An ensemble method has been extensively studied as an algorithm of a hierarchical concept that improves an algorithm for classifying data using a neural network in the fields of statistics and machine learning. The ensemble method representatively includes a bagging method or a boosting method.

In the bagging method, various sets of data are configured by repeatedly performing the sampling of the data randomly, and an estimation result of the model is determined through a voting method by training various models. In a case in which each of the models shows a higher accuracy than 0.5, such a bagging method may increase a final accuracy more as more models are used. In addition, in the boosting method, models are sequentially trained and the expected result is linearly combined. After a first classifier is trained, a second classifier is trained by putting a weight value on data that the first classifier cannot classify well, and the results of the two classifiers are added together in a linear combination to obtain the least amount of error. The boosting method obtains a result by combining various classifier models trained through these processes, and the classification accuracy increases as the number of models increases, which is known to be more effective than the bagging method.

However, in the ensemble method, various models must be trained, and in the boosting method, the various models must be sequentially trained, thus increasing the training time proportionally to the number of models.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an apparatus for classifying data into classes using a neural network apparatus includes an input layer configured to receive input data; an output layer configured to output a plurality of first output values of the input data with respect to each of at least one of the classes, and output only one first output value of the input data with respect to each of a rest of the classes; and a boost pooling layer configured to receive one or more first output values output for each class, and output one second output value for each class.

The output layer may include a number of output nodes for each class equal to a number of the first output values output for each class.

The at least one of the classes with respect to which the plurality of the first output values is to be output, and a number of the first output values to be output with respect to each class of the at least one of the classes, may be determined based on a result of comparing a loss function value for each of the classes calculated using the neural network trained using training data, and a preset threshold.

The boost pooling layer may include one boost pooling node for each class connected to each output node of a corresponding class of the output layer.

Each boost pooling node may be configured to output any one or any combination of any two or more of a maximum, a mean, an average, and a probabilistic selection of the first output values of the output nodes of the corresponding class to which the boost pooling node is connected.

The neural network further may include one or more hidden layers between the input layer and the output layer.

The output layer may include class groups each including an output node for each of the classes; and one hidden layer of the one or more hidden layers may be positioned before the output layer, and may include two or more sets of hidden nodes, each set of which is connected to a different one of the class groups of the output layer.

The apparatus may further include a classifier configured to input the input data to the input layer, receive the one second output value for each class from the boost pooling layer, and determine which class the input data belongs based on the received one second output value for each class.

In another general aspect, a neural network training method for an apparatus for classifying data includes training a first neural network including an input layer and an output layer using training data; calculating a first loss function value for each of a plurality of classes using the trained first neural network; configuring a second neural network by changing the first neural network; training the second neural network using the training data; calculating a second loss function value for each class using the trained second neural network; and determining whether the second neural network is to be reconfigured using either one or both of the first loss function value and the second loss function value.

The configuring of the second neural network may include adding a boost pooling layer including one boost pooling node for each class after the output layer; determining a class for which a plurality of output values are to be output at the output layer; and adding an output node for the determined class to the output layer.

The configuring of the second neural network may further include connecting the added output node to the boost pooling node for a corresponding class; and setting a weight value of the added output node.

The training of the second neural network may include learning and setting weight values for all nodes of the second neural network using all of the training data.

The training of the second neural network may include learning and setting weight values for all nodes of the output layer using all of the training data.

The training of the second neural network may include learning the weight value to be set for the added output node of the output layer using a part of the training data selected based on the first loss function value.

The training of the first neural network may include learning and setting weight values of nodes of the output layer using the training data; and the setting of the weight value of the added output node may include setting the weight value of the added output node based on the weight value of another output node of the output layer for a same class.

The determining of a class for which a plurality of output values are to be output may include determining a class in which the calculated first loss function value is greater than a threshold to be the class for which the plurality of output values are to be output.

Each boost pooling node may be configured to output one output value for a corresponding class by applying any one or any combination of any two or more of a maximum, a mean, an average, and a probabilistic selection to all output values of all output nodes of the output layer for the corresponding class.

The determining of whether the second neural network is to be reconfigured may include reconfiguring the second neural network in response to the second loss function value being greater than a threshold, or in response to a difference between the first loss function value and the second loss function value being greater than a threshold.

Other features and aspects may be apparent from the following detailed description, the drawings, and the claims.

BRIEF DESCRIPTION OF THE DRAWINGS

FIG. 4 is a diagram illustrating another example of the neutral network of FIG. 1.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Hereinafter, examples of an apparatus and method for classifying data using a boost pooling neural network are specifically described with reference to FIGS. 1 to 7.

Figure 1:
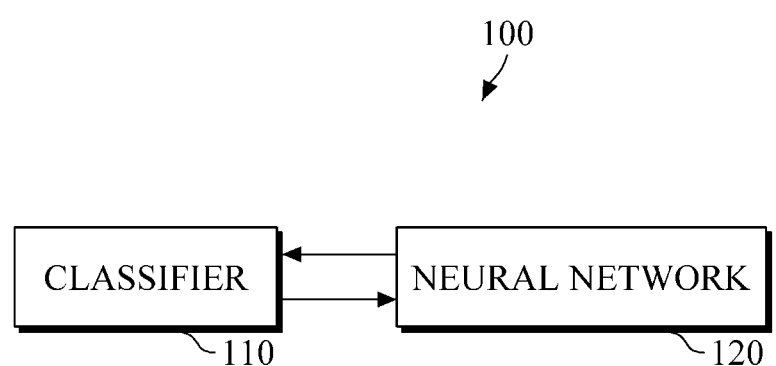
FIG. 1 is a diagram illustrating an example of an apparatus for classifying data.

FIG. 1 is a diagram illustrating an example of an apparatus for classifying data.

Referring to FIG. 1, an apparatus 100 for classifying data includes a classifier 110 and a neural network 120.

The classifier 110 inputs, to the neural network, data to be classified and receives a classification result from the neural network. Using an output value that is output for each class to be classified, the classifier 110 determines one or more classes to which the input data may belong, and finally classifies the input data.

The neural network 120 includes an input layer, a hidden layer, and an output layer, the same as in a general neural network. Data in a vector form is input to the input layer, and one or more classes related to the input data among a plurality of preset classes are output from the output layer. In addition, the neural network 120 is formed by changing a structure of a general neural network, e.g., by changing a structure of the output layer or by adding a boost pooling layer as specifically described below.

The apparatus 100 may be used in a field to distinguish input data with a computer. For example, the apparatus 100 may be used in various fields, such as a field to distinguish objects existing within a photo or a video, a field to distinguish a position of an object to detect and distinguish a lesion from a medical image, a field to understand voice content from voice data, and a field to distinguish a correlation of a document for extracting information from web or document content.

Figure 2:
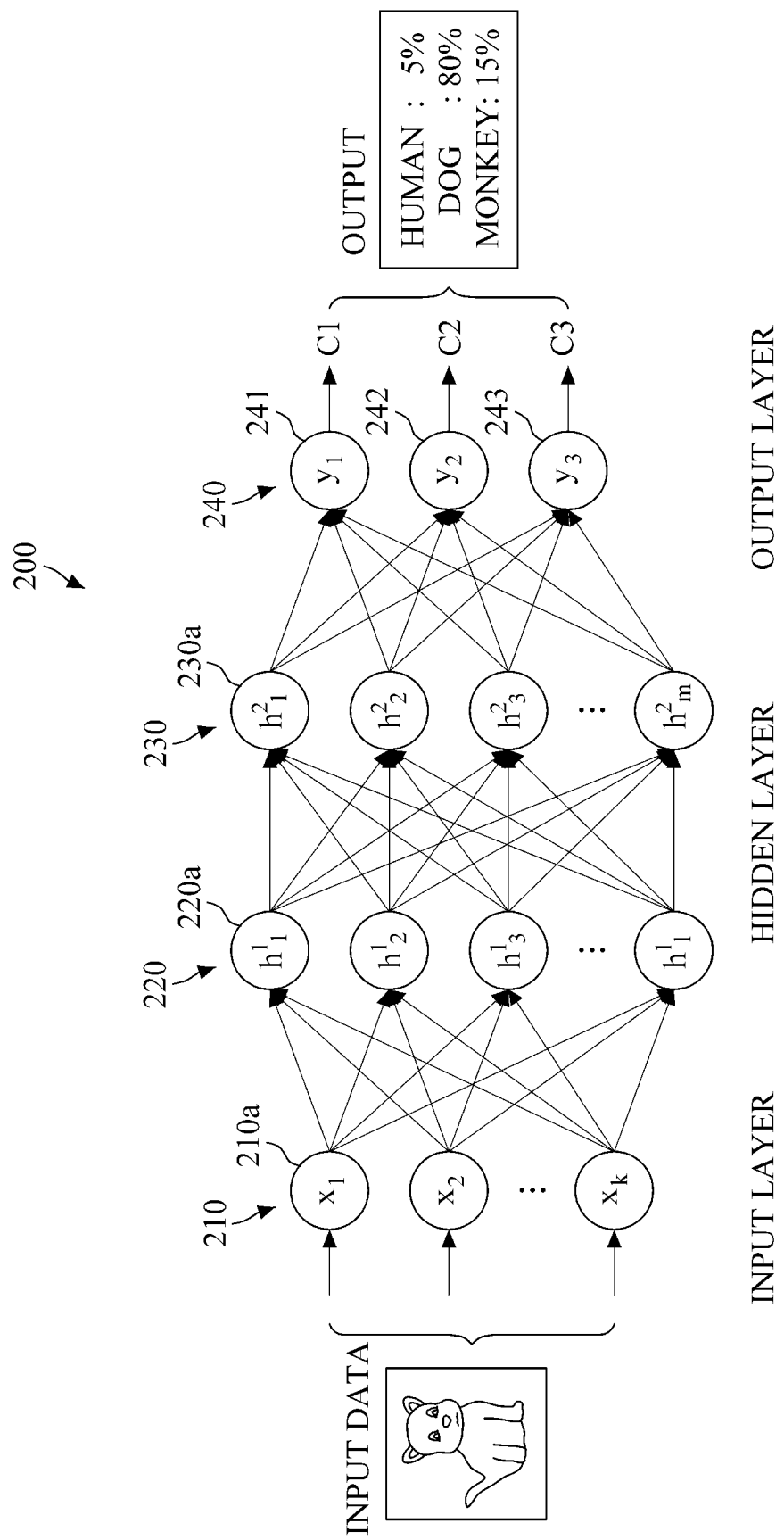
FIG. 2 is a diagram illustrating an example of a general neural network.

FIG. 2 is a diagram illustrating an example of a general neural network.

Referring to FIG. 2, a general neural network 200 includes an input layer 210, hidden layers 220 and 230, and an output layer 240.

The input layer 210 includes k (k≥1) input nodes 210a, and vector input data whose length is k is input to the input nodes 210a so that each element of the vector input data is input to a respective one of the input nodes 210a. The hidden layers 220 and 230 each include one or more hidden nodes 220a and 230a. The output layer 240 includes output nodes 241, 242, and 243, one for each of the classes C1, C2, and C3, respectively, and outputs the output value of the input data for each of the classes C1, C2, and C3.

The structure of the neural network 200 is represented by information on the connections between nodes illustrated as arrows, and a weight value assigned to each connection, which is not illustrated. Nodes within one layer are not connected to one another, but nodes of different layers are fully or partially connected to one another. A fully connected node is connected to all of the nodes of another layer, while a partially connected node is connected to only some of the nodes of another layer.

Each of the nodes connected to the previous nodes with the arrows receives the output of the previous nodes, performs a calculation based on the received output, and outputs the calculation result as an output to the following nodes connected thereto with the arrows. Each of the nodes calculates a value to be output by applying the input to a specific function, e.g., a nonlinear function.

Generally, the structure of the neural network is set in advance, and the weight values for the connections between the nodes are set appropriately using data having an already known answer of which class the data belongs to. The data with the already known answer is called 'training data', and a process of determining the weight value is called 'training'. The neural network 'learns' during the training process. A group of an independently trainable structure and the weight value is called a 'model', and a process of predicting, by the model with the determined weight value, which class the input data belongs to, and then outputting the predicted value, is called a 'testing' process.

The input and output of the neural network of FIG. 2 may be defined by Equation 1 below.

$$x = (x_1, x_2, \ldots, x_k) \qquad (1)$$
$$y_j = P(y = j \mid x), j = 1, \ldots, C$$
$$h_i^{l+1} = f\left(\sum_{j=1}^{n_l} h_j^l \cdot w_{ji} + b_i\right), i = 1, \ldots, n_{l+1}, l = 0, \ldots, L-1$$

Here, x indicates a vector input data having a length k. Also, $y_j$ indicates a probability that the input data x belongs to a j-th class, and C indicates a number of classes. Also, $h_i^l$ indicates an output value of an l-th layer i-th node; $n_l$ indicates a number of nodes in the l-th layer; $b_i$ indicates a bias value of the i-th node; $w_{ji}$ indicates a weight value of a connection between a previous layer j-th node and the following layer i-th node; and a function f indicates a non-linear function, e.g., a sigmoid function $$f(x) = \frac{1}{1+e^{-x}}.$$

Also, L indicates the entire number of layers excluding the input layer.

In the neural network of FIG. 2, L is 3 and C is 3 so that according to Equation 1 above, $h_i^0 = x_i$, $h_i^L = y_i$, $n_0 = k$, $n_L = C$ may be determined.

Hereinafter, referring to FIGS. 3A to 5B, examples of the neural network of FIG. 1 are described in detail. FIGS. 3A to 5B illustrate an output result of the input data with respect to three classes C1, C2, and C3, but the number of classes to be classified is not limited as illustrated.

Figure 3A:
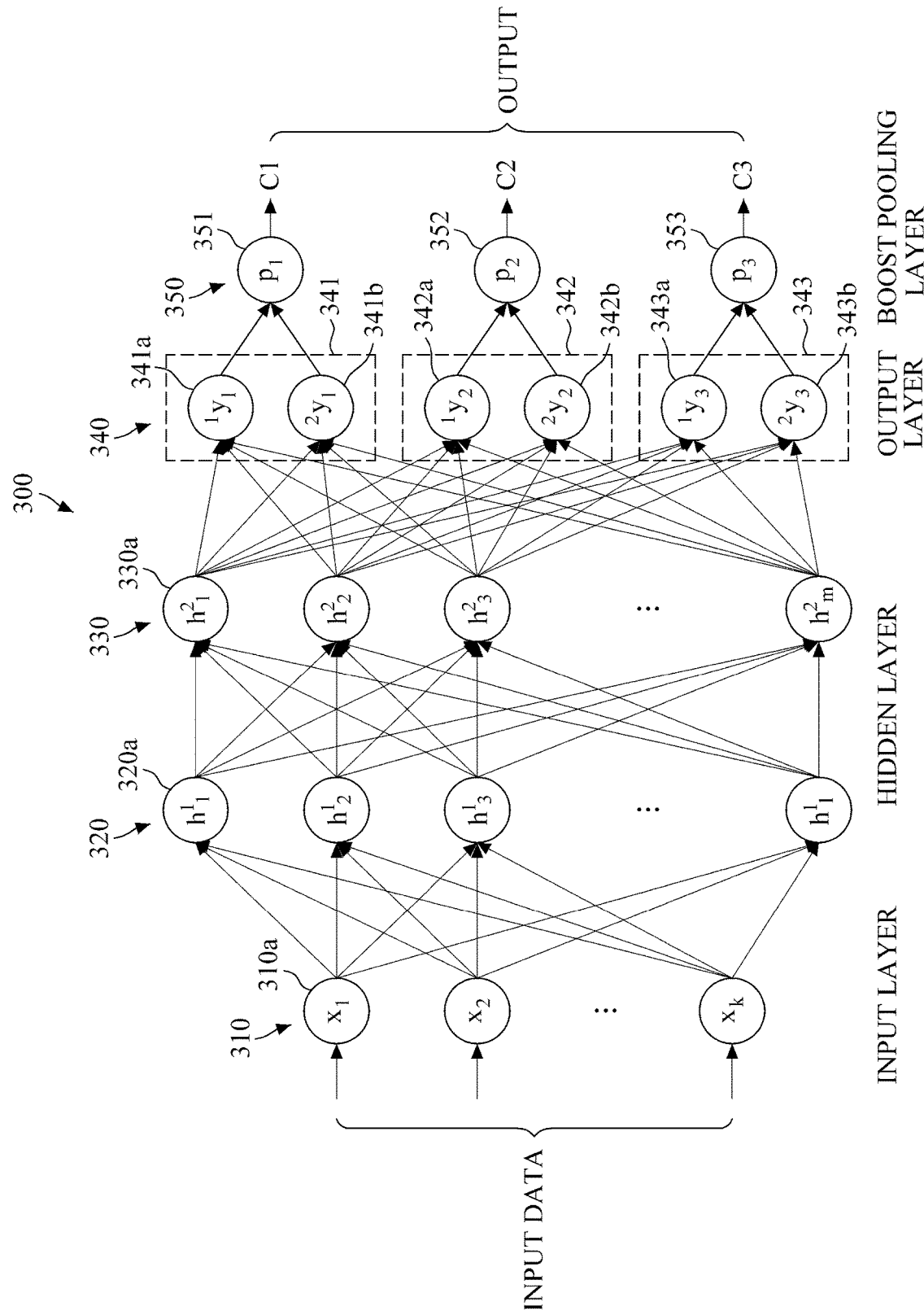
FIGS. 3A and 3B are diagrams illustrating examples of a neutral network of FIG. 1.
Figure 3B:
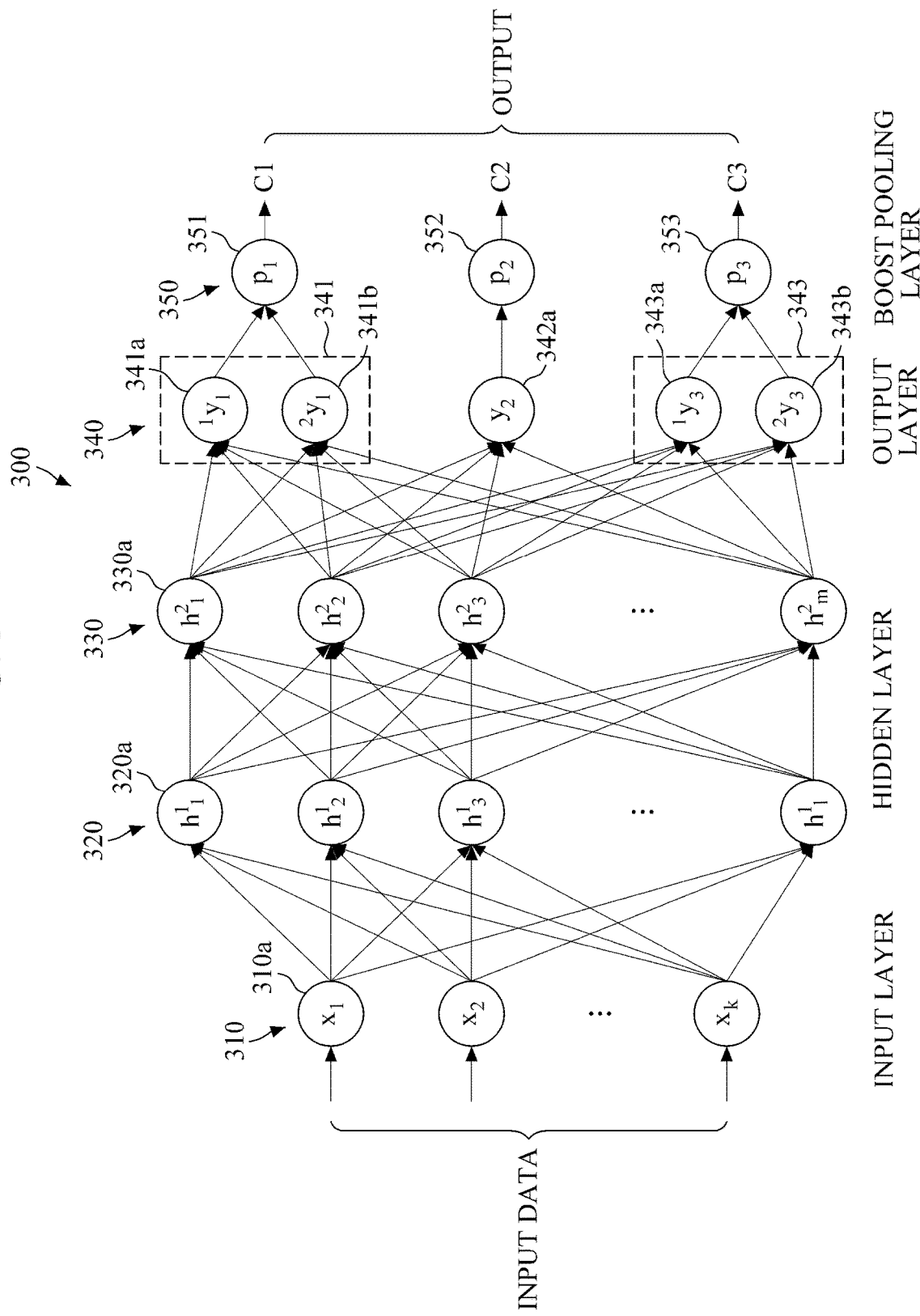

FIGS. 3A and 3B are diagrams illustrating examples of the neutral network 120 of FIG. 1.

Referring to FIGS. 3A and 3B, the neural network 300 include an input layer 310, hidden layers 320 and 330, and an output layer 340, the same as in the general neural network 200 of FIG. 2. Although two hidden layers 320 and 330 are illustrated in FIGS. 3A and 3B, the number of hidden layers is not limited to two. The input layer 310 and the hidden layers 320 and 330 respectively include one or more input nodes 310a and one or more hidden nodes 320a and 330a.

Also, the neural network 300 further includes a boost pooling layer 350 subsequent to the output layer 340. The boost pooling layer 350 is connected to the output layer 340 as illustrated in FIGS. 3A and 3B, receives the output values of the output layer 340 for each of the classes C1, C2, and C3, and outputs one output value for each of the classes C1, C2, and C3. In these examples, the boost pooling layer 350 includes three boost pooling nodes 351, 352, and 353. The boost pooling node 351 outputs one output value for the class C1, the boost pooling node 352 outputs one output value for the class C2, and the boost pooling node 353 outputs one output value for the class C3.

Also, the output layer 340 is different from the output layer 240 of the general neural network 200 in FIG. 2 as illustrated in FIGS. 3A and 3B. That is, the output layer 340 includes a plurality of output nodes for each of the classes in order to output a plurality of output values with respect to at least a part of a plurality of classes to be classified.

In one example, referring to FIG. 3A, the output layer 340 is configured to output the two output values separately with respect to all of the classes C1, C2, and C3. That is, as illustrated in FIG. 3A, the output layer 340 is configured to include two output nodes 341a and 341b that output two output values with respect to the class C1; two output nodes 342a and 342b that output two output values with respect to the class C2; and two output nodes 343a and 343b that output two output values with respect to the class C3.

In another example, referring to FIG. 3B, the output layer 340 is configured to output two output values with respect to some classes C1 and C3. That is, as illustrated in FIG. 3B, the output layer 340 is configured to include the output nodes 341a and 341b and the output nodes 343a and 343b to output two output values, respectively, with respect to the classes C1 and C3; and is configured to include one output node 342a to output one output value with respect to the second class C2.

The neural network 300 of FIGS. 3A and 3B are different with respect to some classes in the configuration of the output node, but operate in practically the same way. Thus, the neural network 300 are described only referring to FIG. 3A, hereinafter.

The boost pooling nodes 351, 352, and 353 of the added boost pooling layer 350 are respectively connected to the sets 341, 342, and 343 of the output nodes of the output layer 340. For example, the output nodes 341a and 341b to output the output value with respect to the class C1 are connected to the boost pooling node 351; the output nodes 342a and 342b to output the output value with respect to the class C2 are connected to the boost pooling node 352; and the output nodes 343a and 343b to output the output with respect to the class C3 are connected to the boost pooling node 353.

In addition, a specific weight value is set with respect to connection of each of the output nodes 341a, 341b, 342a, 342b, 343a, and 343b of the output layer 340. In a case in which there are weight values that are set with respect to the connections of the existing output nodes 341a, 342a, and 343a, the weight values that are set with respect to the connections of the existing output nodes 341a, 342a, and 343a may be used as they are. Alternatively, weight values processed in various ways may be set as the weight values with respect to the connections of the newly added output nodes 341b, 342b, and 343b. For example, in a case in which there are a plurality of the output nodes with respect to each of the existing classes, an average, a maximum, and a mean of the weight values that are set with respect to the connection of each of the existing output nodes may be set as the weight values.

Although the output layer 340 is illustrated in FIG. 3A as including two output nodes for each of the classes, the number of the output nodes added to a certain class is not limited to two. That is, determination of the classes to change the number of the output nodes, or the number of the output nodes to be added with respect to the determined classes, and the weight values with respect to the connections of the added output nodes, may be adjusted through repeated training using training data. For example, the neural network before and after changing its structure is trained using the training data, and a loss function value is calculated using each of the trained neural network. Thus, a class for changing the number of the output nodes, or the number and weight value of the output nodes with regard to the class, may be adjusted based on the calculated loss function value.

The relation between the output layer 340 and the boost pooling layer 350 may be defined by Equation 2 below.

$$p_j = \text{pool}({}^1 y_j, \ldots, {}^t y_j) \quad (2)$$

In Equation 2, j indicates a j-th class; t, the number of internal output nodes to perform pooling for each of the classes; ${}^t y_j$, the output value that is output by the t-th output node with respect to the j-th class; and $p_j$, the output value of the boost pooling node with respect to the j-th class. Also, the pool function is a specific function to receive various inputs and output one output value, which is, for example, a function of performing any one or any combination of any two or more of a maximum, a mean, an average, and a probabilistic selection. The probabilistic selection indicates selecting one output value, e.g., the output value having a highest probability, based on a probability proportional to a plurality of the output values.

One of such various pool functions is applied to each of the boost pooling nodes 351, 352, and 353, and one final output value is output for each of the classes C1, C2, and C3 through the adjusted pool function.

FIG. 4 is a diagram illustrating another example of the neutral network 120 of FIG. 1.

A neural network 400 includes an input layer 410 that includes an input node 410a, hidden layers 420 and 430 that include hidden nodes 420a, 431a, and 431b, and an output layer 440, the same as neural network 300 in FIG. 3A. Also, a boost pooling layer 450 including boost pooling nodes 451, 452, and 453 that output a final output value for each of classes C1, C2, and C3 is added to the neural network 400. Also, the output layer 440 is configured to include output nodes 441a and 441b, output nodes 442a and 442b, and output nodes 443a and 443b, respectively, with regard to the classes C1, C2, and C3. As a result, the output nodes of the output layer 440 are divided into two class groups CG1 and CG2 as illustrated in FIG. 4.

Also, in the neural network 400, the structure of the hidden layers 420 and 430 is further changed to form, in a single model, a structure that is the same as or similar to using a plurality of models. For example, in the hidden layer 430 connected to the output layer 440 as illustrated in FIG. 4, a set N2 of new hidden nodes including the hidden node 431b is added to a set N1 of the existing hidden nodes including the existing hidden node 431a; and the sets N1 and N2 of the hidden nodes added in parallel to class groups of the output nodes are connected to class groups CG1 and CG2 of the output nodes, respectively. However, the example not limited thereto, and changing a structure of hidden layers 420 and 430 may be performed being extended sequentially from the hidden layer 430 connected to the output layer 440 to a previous hidden layer 420.

In this example, since the neural network 400 performs boost pooling by sharing a part of the hidden nodes in a single model of the neural network 400, testing time and training time may be reduced.

Figure 5A:
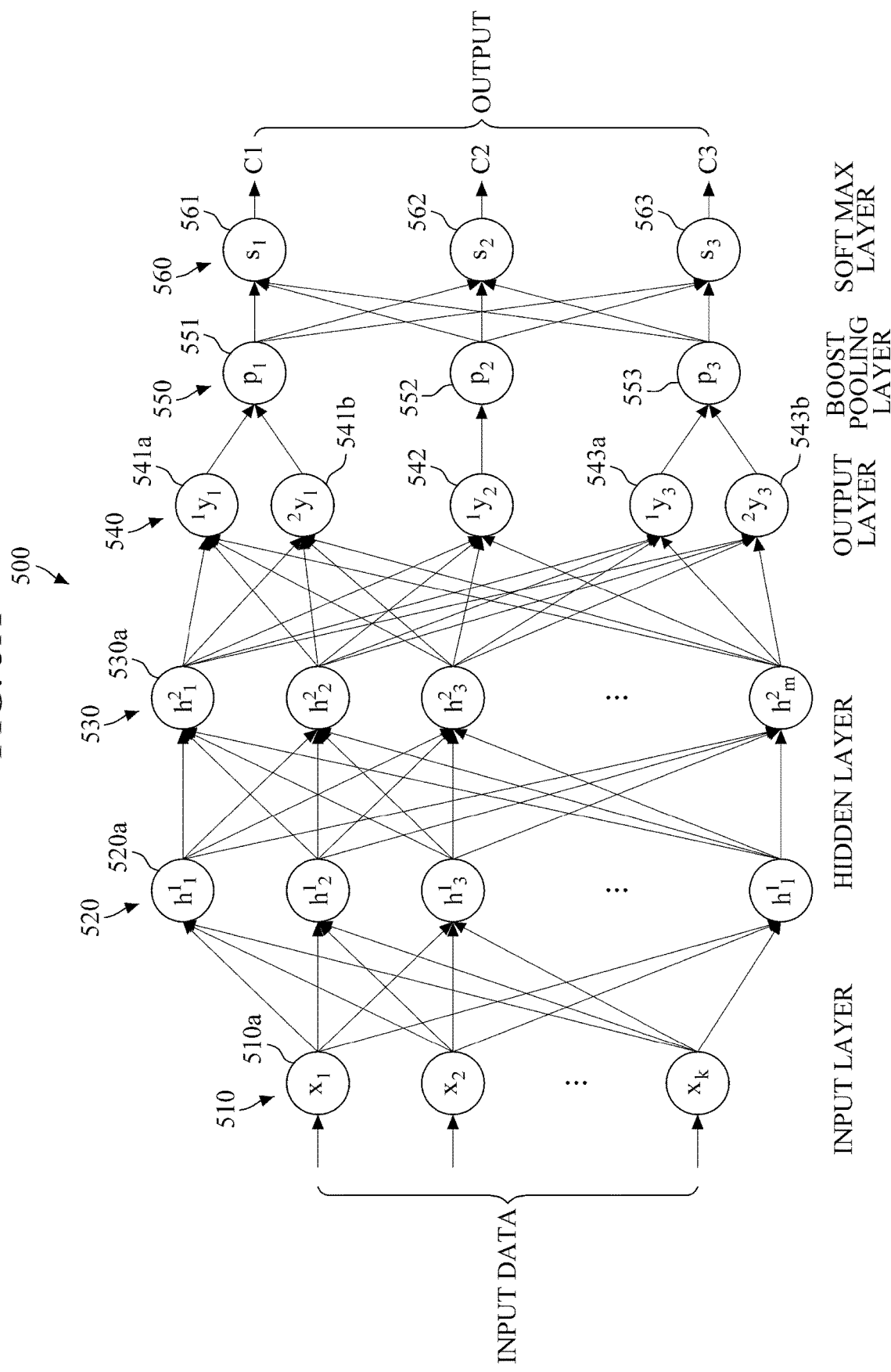
FIGS. 5A and 5B are diagrams illustrating other examples of the neutral network of FIG. 1.
Figure 5B:
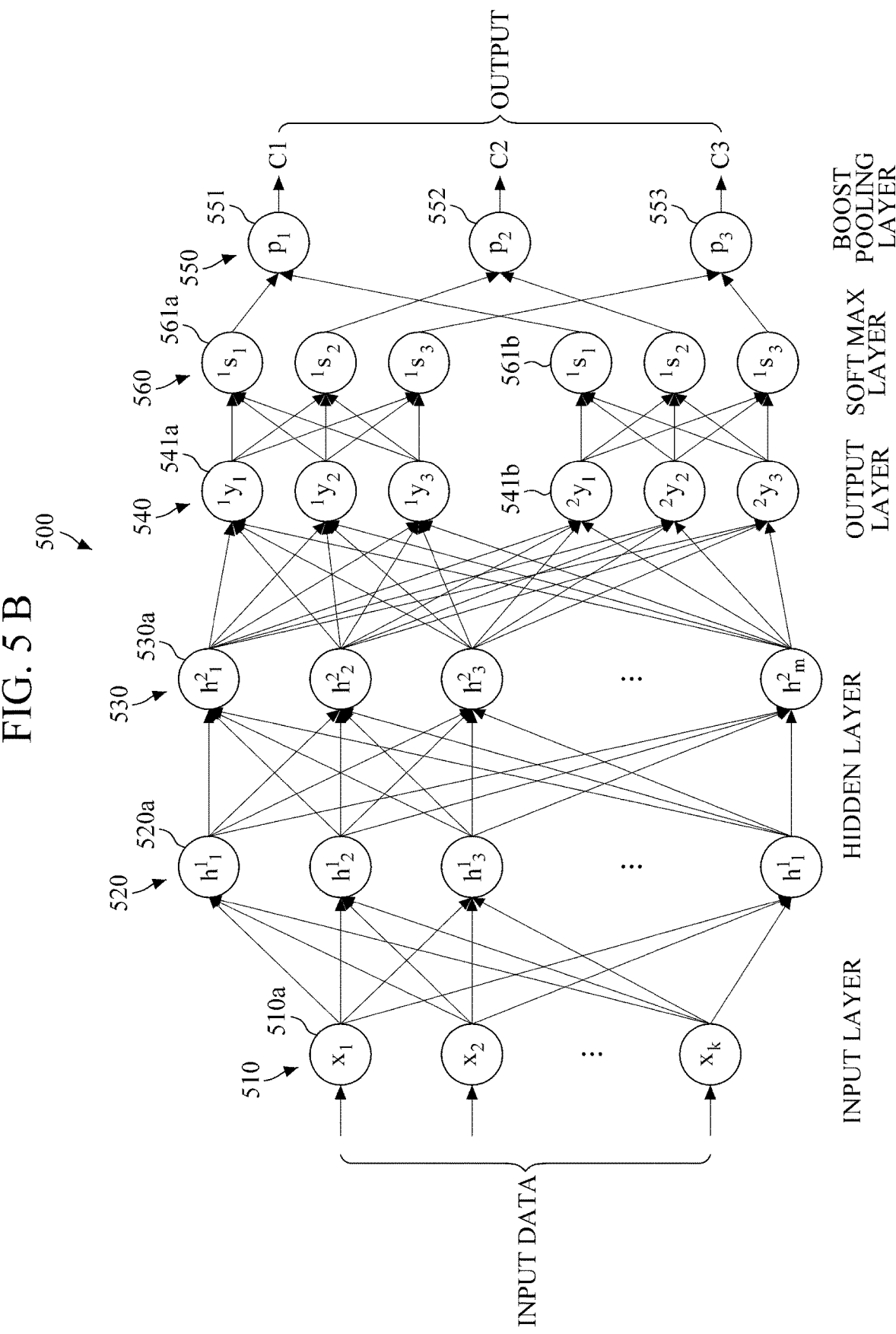

FIGS. 5A and 5B are diagrams illustrating other examples of the neutral network 120 of FIG. 1.

A neural network 500 includes an input layer 510 including an input node 510a, hidden layers 520 and 530 including hidden nodes 520a and 531a, an output layer 540, a boost pooling layer 550, and a softmax layer 560.

In other words, the neural network 500 includes the boost pooling layer 550, which is described above, in addition to a structure that further includes a softmax layer 560 subsequent to the output layer 540, and also has a structure where the output layer 540 has a plurality of output nodes with respect to at least a part of the classes.

The softmax layer 560 performs normalizing on the output value of the previous layer so that each of the output values is not greater than one and so that a sum of the all of the output values is one, thus making the output value of each of the classes represent a probability that the input data belongs to the class. The normalizing may be performed by adding the results of an exponential function and dividing them as shown in Equation 3 below.

In the example in FIG. 5A, the boost pooling layer 550 is added before the softmax layer 560. According to FIG. 5A, because the softmax layer 560 generally performs a role of an additional processing after a final output value for each of the classes is output, the boost pooling layer 560 is added before the softmax layer 560. As illustrated in FIG. 5A, the three boost pooling nodes 551, 552, and 553 are separately connected to an output node 541a and 541b, an output node 542, and output nodes 543a and 543b. In addition, each of the boost pooling nodes 551, 552, and 553 is connected to three softmax nodes 561, 562, and 563.

The boost pooling layer 550 and the softmax layer 560 establish a relationship that may be defined by Equation 3 below.

$$s_j = \frac{e^{p_j}}{\sum_{i=1}^{C} e^{p_i}}, j = 1, \ldots, C \quad (3)$$

In Equation 3, C indicates the number of classes to be classified; $p_j$, an output value of the boost pooling node with respect to a j-th class; and $s_j$, an output value of the softmax node with respect to the j-th class.

In the example in FIG. 5B, the boost pooling layer 550 is added after the softmax layer 560. The output layer 540 and the softmax layer 560 configure output nodes and softmax nodes to output two output values with respect to each of the classes C1, C2, and C3, and connect the output nodes and the softmax nodes to correspond to each of the classes. As illustrated in FIG. 5B, with respect to the class C1, two output nodes 541a and 541b and two softmax nodes 561a and 561b are added before the boost pooling layer, the softmax node 561a is connected to the output node 541a, and the softmax node 561b is connected to the output node 541b. The boost pooling node 551 of the boost pooling layer 550 receives the output values of the two softmax nodes 561a and 561b, and outputs one output value with respect to the class C1. The boost pooling nodes 552 and 553 of the boost pooling layer 550 operate in the same way.

The output layer 540, the softmax layer 560, and the boost pooling layer 550 establish a relationship that may be defined by Equation 4 below.

$$ {}^k s_j = \frac{e^{{}^k y_j}}{\sum_{i=1}^{C} e^{{}^k y_i}}, j = 1, \ldots, C, k = 1, \ldots, t \quad (4)$$

-continued $$p_j = \text{pool}(^1s_j, \ldots, ^ts_j)$$

In Equation 4, C indicates the number of classes to be classified; t, the number of internal nodes to be pooled for each of the classes; $p_j$, an output value of the boost pooling node with respect to the j-th class; and $^ks_j$, an output value of a k-th softmax node with respect to the j-th class. In addition, $^ky_j$ indicates an output value of the k-th output node with respect to the j-th class.

Examples of output values with respect to three classes C1, C2, and C3 calculated for the examples of FIGS. 5A and 5B by applying Equations 3 and 4 are shown in Tables 1 and 2 below. It is assumed that $^1y_1=1$, $^1y_2=3$, $^1y_3=9$, $^2y_1=2$, $^2y_2=2$, $^2y_3=2$, and that a function applied to the boost pooling node is a function of calculating a maximum.

TABLE 1

Output Values for Example of FIG. 5A

| Boost pooling layer | Softmax layer (final output value) |
|---|---|
| p1 = 2 | s1 = 0.0009 |
| p2 = 3 | s2 = 0.0002 |
| p3 = 9 | s3 = 0.99 |

TABLE 2

Output Values for Example of FIG. 5B

| Softmax layer | Boost pooling layer (final output value) |
|---|---|
| $^1s_1 = 0.0003$, $^2s_1 = 0.34$ | p1 = 0.34 |
| $^1s_2 = 0.002$, $^2s_2 = 0.34$ | p2 = 0.34 |
| $^1s_3 = 0.99$, $^2s_3 = 0.34$ | p3 = 0.99 |

Referring to Tables 1 and 2, the two tables are the same in that the output value with respect to the third class has the biggest value. However, in the case of Table 2, since the second output values ($^2s_1=0.34$, $^2s_2=0.34$, $^2s_3=0.34$) with respect to each of the classes of the softmax layer are the same, the first output value p1=0.34 and the second output value p2=0.34 that are finally output from the boost pooling layer are calculated to be relatively large compared to the first output value s1=0.0009 and the second output value s2=0.0002 of Table 1. Thus, the example of FIG. 5A standardizes a low output value through normalization to prevent the output values from being overestimated as they are in the example of FIG. 5B.

Figure 6:
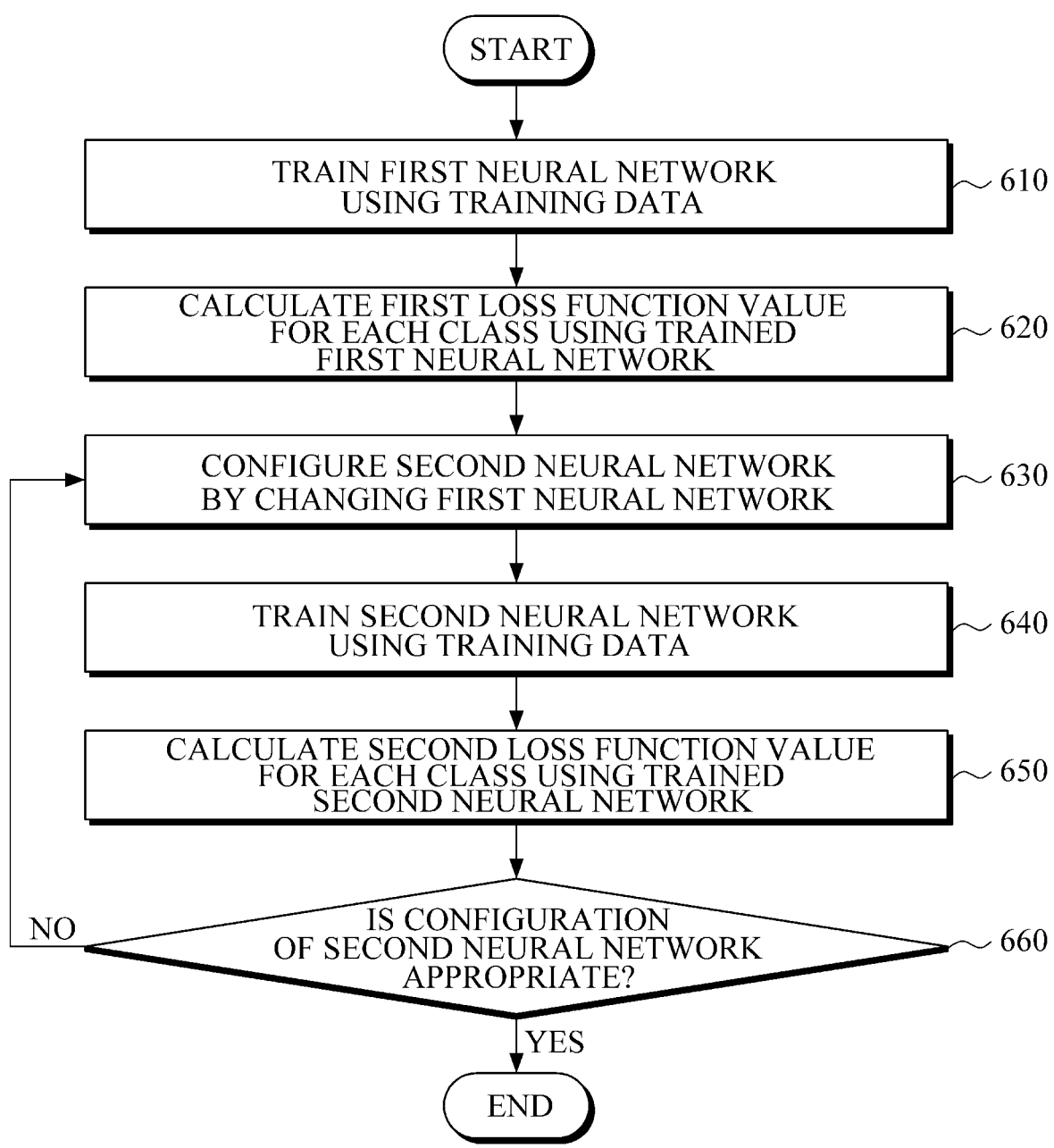
FIG. 6 is a diagram illustrating an example of a method of training a neural network for an apparatus for classifying data.
Figure 7:
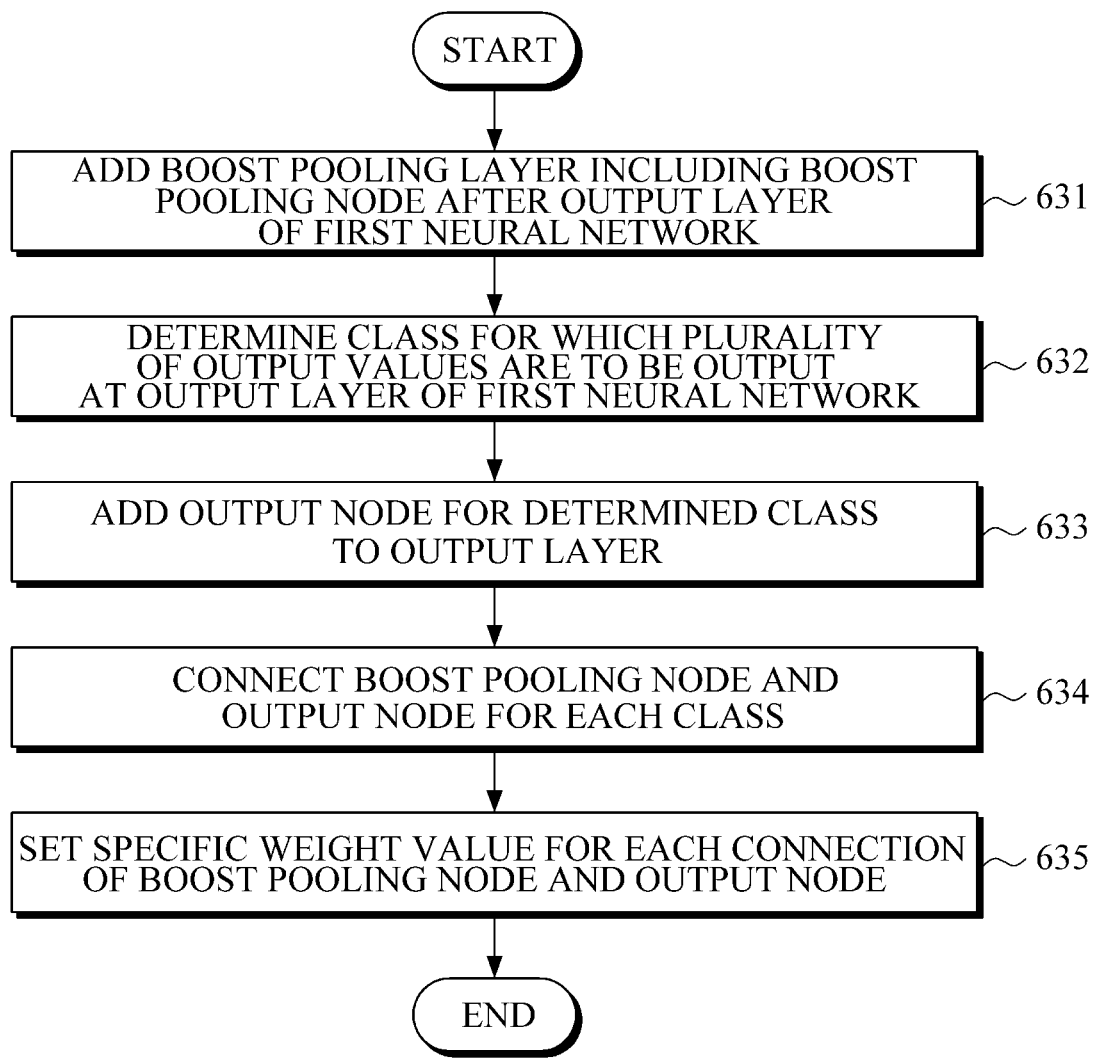
FIG. 7 is a detailed flowchart illustrating an example of an operation of configuring a second neutral network of FIG. 6.

FIG. 6 is a diagram illustrating an example of a method of training a neural network for an apparatus for classifying data. FIG. 7 is a detailed flowchart illustrating an example of an operation of configuring a second neutral network of FIG. 6.

FIGS. 6 and 7 are examples of a method of training a neural network for the apparatus 100 for classifying data of FIG. 1.

First, referring to FIG. 6, by using training data having an already known answer, the apparatus 100 trains a first neural network before changing its structure in 610. The first neural network may be a general neural network 200 as illustrated in FIG. 2. The apparatus 100 learns all of the weight values of the first neural network during the training using a back propagation learning method.

Generally, the back propagation learning method is a method of efficiently implementing a gradient descent method, which is one of known optimization techniques, to minimize a loss function shown as a function with an answer of the given data and a predicted value of a current model.

Equation 5 shown below is one example of known loss functions, and is an example of a maximum likelihood loss function. The maximum likelihood loss function is a method of maximizing a probability for an answer value to be output from the given data regardless of a distribution of the given data.

$$x = (x_1, x_2, \ldots, x_k) \quad (5)$$

$$z = (z_1, z_2, \ldots, z_n), z_j = 1, z_i = 0 \text{ if } i \neq j$$

$$y_j = P(y = j \mid x; M)$$

$$L(x, z) = -\ln p(z \mid x) = -\sum_{i=1}^{n} z_i \ln y_i$$

In Equation 5, x indicates a vector input data having a length k; and z, an answer vector having a length n. If the given input data belongs to a j-th class, only the j-th element of z is 1, the rest of the elements of z are 0, and n is the number of available classes. $y_j$ indicates a probability that the input data belongs to the j-th class, wherein the probability has been calculated by a model M; and L(x, z), the maximum likelihood loss function.

The gradient descent method is a method of finding a minimum value by repeating several times a process of multiplying a determined number by a current weight value's gradient that is acquired after substituting the current weight value for a gradient vector partially differentiated based on each changeable weight value and subtracting the multiplied number from the weight value. Such a method of calculating a gradient vector is a back propagation learning method. Because the back propagation learning method itself is well known in the machine learning technology field, a detailed description is omitted hereinafter.

Then, if the training of the neural network is completed, the apparatus 100 calculates a first loss function value for each of the classes using the trained first neural network in 620. That is, if the training of the first neural network is completed, the apparatus 100 calculates the first loss function value acquired after applying a loss function that is set in advance to the back propagation learning method for each of the classes with respect to training data and testing data, and sums up the first loss function values. Whether the training is finished may be determined, for example, according to whether the training has been performed a predetermined number of times, or according to whether the loss function value calculated after each of the training performances is completed is lower than a preset threshold.

Then, the apparatus 100 configures a second neural network by changing a structure of the first neural network in 630.

Referring to FIG. 7, an example of the operation 630 of configuring the second neural network is more specifically described.

First, the apparatus 100 adds a boost pooling layer including boost pooling nodes that output one output value to the first neural network for each of the classes in 631.

Then, the apparatus 100 determines a class for outputting a plurality of output values at the output layer of the first neural network in 632. To determine with respect to which class the output node is to be added, the apparatus 100 uses the first loss function value for each of the classes, which is calculated in the operation 620, and the second loss function value for each of the classes, which is calculated in the operation 650 described below.

For example, in a case in which the first loss function value or the second loss function value, which is calculated with respect to one class, is greater than a preset threshold, the apparatus 100 determines that an error with respect to that class is so big that an output node is to be added for that class. Also, the number of added output nodes may be determined according to a degree by which the first loss function value or the second loss function value is greater than a threshold. For example, the apparatus 100 may set in advance, in a plurality of stages, the degree by which the first loss function value or the second loss function value is greater than the threshold, and define the number of the output nodes to be added for each of the stages.

Then, for the determined classes, the apparatus 100 adds the output nodes to the output layer in 633.

Then, the apparatus 100 connects the boost pooling nodes to the output nodes, and the output nodes to the hidden nodes, in 634. The boost pooling nodes and the output nodes may be connected between the nodes that correspond to each other by each of the class units.

Then, the apparatus 100 sets a weight value with respect to connections between the output nodes and the previous hidden nodes, and between the output nodes and the subsequent boost pooling nodes in 635. The weight value is a value that is set randomly, and the apparatus 100 may use the weight value, as it is, with respect to other output nodes of the same class for any output node that is added according to the need. Alternatively, in a case of other two output nodes, the apparatus 100 may use the processed weight value of each of the output nodes, e.g., an average value.

Referring to FIG. 6 again, if the second neural network is configured in 630, the apparatus 100 trains the second neural network by using training data in 640.

In one example, all of the weight values of the second neural network that is configured with the back propagation learning method are learned by using all of the training data.

In another example, the training is not performed with respect to all of the weight values of the second neural network, but is performed only with respect to the weight values that are set with regard to the layers connected after the output layer using all of the training data. Accordingly, the training time due to the addition of the boost pooling layer may be reduced.

In yet another example, first the training for a part of the training data is performed only with respect to the weight values of the output nodes added to the second neural network, then the training is performed again with respect to the all of the weight values using all of the training data, or with respect to the weight values for the layers connected to after the output layer. The part of the training data may be selected according to a first loss function value or a second loss function value that is calculated before the structure of the first neural network is changed. As described above, such an example is used more effectively in a case in which the weight values for other output nodes of the same class in terms of the connections of the added output nodes are used as they are or used after the process. That is, in such a case, preset weight values are used with respect to the same class without using the specific weight values, thus enabling the training to be faster than when the specific weight values are used.

Then, if the training of the second neural network is completed, the apparatus 100 calculates and adds up the second loss function value for each of the classes using the trained second neural network in 650.

Then, using the calculated first loss function value or the calculated second loss function value, the apparatus 100 determines whether the configuration of the second neural network is appropriate in 660. For example, in a case in which all of the second loss function values that are calculated for each of the classes of the second neural network are less than a preset threshold, or their sum is less than a preset threshold, the apparatus 100 determines that the second neural network has been configured appropriately. In another example, in a case that a difference between the first loss function value with respect to the first neural network before its structure is changed and the second loss function value with respect to the second neural network after the structure is changed is greater than a preset threshold, the apparatus 100 determines that the second neural network has been configured appropriately.

In a case in which a part of the second loss function values for each of the classes or the sum of the second loss function values is greater than a preset threshold, or in a case in which the sum of the first loss function values and the sum of the second loss function values are greater than a preset threshold, the apparatus 100 determines that the second neural network has not been configured appropriately, repeats the operations beginning with the operation 630. The second neural network again becomes the first neural network so that the process proceeds to the operation 630.

The classifier 110, the neural networks 120, 200, 300, 400, and 500, the nodes of the input layers 210, 310, 410, and 510, the nodes of the hidden layers 220, 230, 320, 330, 420, 430, 520, and 530, the nodes of the output layers 240, 340, 440, and 540, the nodes of the boost pooling layers 350, 450, and 550, and the nodes of the softmax layer 560 in FIGS. 1 through 5B that perform the operations described herein with respect to FIGS. 1-7 are implemented by hardware components. Examples of hardware components include controllers, generators, drivers, memories, comparators, arithmetic logic units, adders, subtractors, multipliers, dividers, integrators, and any other electronic components known to one of ordinary skill in the art. In one example, the hardware components are implemented by computing hardware, for example, by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. 1-7. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 6 and 7 that perform the operations described herein with respect to FIGS. 1-7 are performed by a processor or a computer as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, that various modifications may be made. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An apparatus for classifying data into classes using a neural network, the apparatus comprising:
   one or more processors configured to:
   receive input data to an input layer of the neural network;
   using an output layer of the neural network comprising class groups, generate first output values of the input data with respect to each of at least one of the classes, and generate only one second output value of the input data with respect to each of a rest of the classes;
   using a boost pooling layer, generate respective final output values for each class from the first output values and the second output values, including performing one or more respective poolings of the first output values; and
   perform a classifying of the input data based on the generating of the respective final output values,
   wherein the neural network comprises a hidden layer comprising two or more sets of hidden nodes, each set being connected to a different one of the class groups of the output layer.

2. The apparatus of claim 1, wherein the output layer comprises a number of output nodes for each class equal to a number of the first output values and the second output value, respectively output for each class.

3. The apparatus of claim 2, wherein the at least one of the classes with respect to which the plurality of the first output values is to be output, and a number of the first output values to be output with respect to each class of the at least one of the classes, are determined based on a result of comparing a loss function value for each of the classes calculated using the neural network trained using training data, and a preset threshold.

4. The apparatus of claim 2, wherein the boost pooling layer comprises one boost pooling node for each class connected to each output node of a corresponding class of the output layer.

5. The apparatus of claim 4, wherein each boost pooling node is configured to output any one or any combination of any two or more of a maximum, a mean, an average, and a probabilistic selection of the first output values of the output nodes of the corresponding class to which the boost pooling node is connected.

6. The apparatus of claim 1, wherein the neural network further comprises one or more hidden layers, including the hidden layer, between the input layer and the output layer.

7. The apparatus of claim 6, wherein the output layer comprises the class groups each comprising an output node for each of the classes; and
   the hidden layer of the one or more hidden layers is positioned before the output layer, and comprises the two or more sets of hidden nodes, each set of which is connected to the different one of the class groups of the output layer.

8. The apparatus of claim 1, wherein, for the performing of the classifying of the input data, the one or more processors are further configured to receive the generated respective final output values for each class from the boost pooling layer, and determine which class the input data belongs based on the generated respective final output values for each class.

9. A processor-implemented method of training a neural network for an apparatus for classifying data using the trained neural network, the neural network training method comprising:
- training a first neural network comprising an input layer and an output layer using training data;
- calculating a first loss function value for each of a plurality of classes using the trained first neural network;
- generating a second neural network by changing configuration of the first neural network by adding a boost pooling layer;
- training the second neural network using the training data;
- calculating a second loss function value for each class using the trained second neural network; and
- determining whether the second neural network is to be reconfigured using either one or both of the first loss function value and the second loss function value.

10. The neural network training method of claim 9, wherein:
- the boost pooling layer comprises one boost pooling node for each class after the output layer; and
- the generating of the second neural network further comprises:
  - determining a class for which a plurality of output values are to be output at the output layer; and
  - adding an output node for the determined class to the output layer.

11. The neural network training method of claim 10, wherein the configuring of the second neural network further comprises:
- connecting the added output node to the boost pooling node for a corresponding class; and
- setting a weight value of the added output node.

12. The neural network training method of claim 11, wherein the training of the second neural network comprises learning and setting weight values for all nodes of the second neural network using all of the training data.

13. The neural network training method of claim 11, wherein the training of the second neural network comprises learning and setting weight values for all nodes of the output layer using all of the training data.

14. The neural network training method of claim 11, wherein the training of the second neural network comprises learning the weight value to be set for the added output node of the output layer using a part of the training data selected based on the first loss function value.

15. The neural network training method of claim 11, wherein the training of the first neural network comprises learning and setting weight values of nodes of the output layer using the training data; and
the setting of the weight value of the added output node comprises setting the weight value of the added output node based on the weight value of another output node of the output layer for a same class.

16. The neural network training method of claim 10, wherein the determining of a class for which a plurality of output values are to be output comprises determining a class in which the calculated first loss function value is greater than a threshold to be the class for which the plurality of output values are to be output.

17. The neural network training method of claim 10, wherein each boost pooling node is configured to output one output value for a corresponding class by applying any one or any combination of any two or more of a maximum, a mean, an average, and a probabilistic selection to all output values of all output nodes of the output layer for the corresponding class.

18. The neural network training method of claim 9, wherein the determining of whether the second neural network is to be reconfigured comprises reconfiguring the second neural network in response to the second loss function value being greater than a threshold, or in response to a difference between the first loss function value and the second loss function value being greater than a threshold.

19. A processor-implemented method of classifying data into classes using a neural network, the method comprising:
- receiving input data to an input layer of the neural network;
- using an output layer of the neural network comprising class groups, generating first output values of the input data with respect to each of at least one of the classes, and generating only one second output value of the input data with respect to each of a rest of the classes;
- using a boost pooling layer, generating respective final output values for each class from the first output values and the second output values, including performing one or more respective poolings of the first output values; and
- performing a classifying of the input data based on the generating of the respective final output values,
wherein the neural network comprises a hidden layer comprising two or more sets of hidden nodes, each set being connected to a different one of the class groups of the output layer.

20. The method of claim 19, wherein the boost pooling layer comprises one boost pooling node for each class connected to each output node of a corresponding class of the output layer.

21. The method of claim 19, wherein each boost pooling node for each class, included in the boost pooling layer, is configured to output any one or any combination of any two or more of a maximum, a mean, an average, and a probabilistic selection of the first output values of the output nodes of the corresponding class to which each boost pooling node is connected.

* * * * *